(12) United States Patent
Ishibashi (10) Patent No.: US 8,608,470 B2
(45) Date of Patent: Dec. 17, 2013

(54) APPARATUS FOR REMOVING RESIN MOLDED PRODUCT

(75) Inventor: Shoji Ishibashi, Aichi-ken (JP)

(73) Assignee: Star Seiko Co., Ltd., Nagoya-Shi (JP)

( * ) Notice: Subject to any disclaimer, the term of this patent is extended or adjusted under 35 U.S.C. 154(b) by 57 days.

(21) Appl. No.: 13/472,764

(22) Filed: May 16, 2012

(65) Prior Publication Data

US 2012/0294961 A1    Nov. 22, 2012

(30) Foreign Application Priority Data

May 19, 2011 (JP) ................................. 2011-112103

(51) Int. Cl.
*A01J 21/00* (2006.01)

(52) U.S. Cl.
USPC ................ 425/444; 425/436 R; 425/436 RM; 425/556; 414/749.1; 414/751.1; 414/753.1; 74/840; 74/842

(58) Field of Classification Search
USPC ...................... 425/436 R, 436 RM, 444, 556; 414/749.1, 751.1, 753.1; 74/840, 842
See application file for complete search history.

(56) References Cited

U.S. PATENT DOCUMENTS

| | | | | |
|---|---|---|---|---|
| 3,153,262 | A | * | 10/1964 | Steketee ........................ 425/351 |
| 3,920,374 | A | * | 11/1975 | Redmer et al. ............ 425/436 R |
| 4,274,617 | A | * | 6/1981 | Schriever ........................ 249/63 |
| 4,652,204 | A | * | 3/1987 | Arnett ........................ 414/751.1 |
| RE32,414 | E | * | 5/1987 | Hutchins et al. ........... 414/744.6 |
| 4,721,005 | A | * | 1/1988 | Yoshiji et al. .............. 74/490.04 |
| 4,787,841 | A | * | 11/1988 | Simon ........................... 425/556 |
| 4,795,124 | A | * | 1/1989 | Nagai ........................... 249/66.1 |
| 4,901,589 | A | * | 2/1990 | Gaigl ............................... 74/104 |
| 5,354,194 | A | * | 10/1994 | Kresak ...................... 425/436 R |
| 6,162,037 | A | * | 12/2000 | Verwoerd .................. 425/126.1 |
| 6,267,574 | B1 | * | 7/2001 | Bowman et al. ................ 425/78 |
| 6,471,504 | B1 | * | 10/2002 | Matsui ........................... 425/556 |
| 6,485,285 | B1 | * | 11/2002 | Shiotani ........................ 425/139 |
| 6,516,866 | B1 | * | 2/2003 | Jones ............................. 164/132 |
| 7,118,365 | B2 | * | 10/2006 | Shirahata et al. ............. 425/139 |
| 2002/0086085 | A1 | * | 7/2002 | Takayama et al. ............ 425/556 |
| 2003/0152661 | A1 | * | 8/2003 | Yu et al. ................. 425/436 RM |
| 2005/0202116 | A1 | * | 9/2005 | Kinoshita et al. ............. 425/444 |

FOREIGN PATENT DOCUMENTS

| JP | 2003-245927 A | 9/2003 |
|---|---|---|
| JP | 2003-300232 A | 10/2003 |

* cited by examiner

*Primary Examiner* — Joseph S Del Sole
*Assistant Examiner* — David N Brown, II
(74) *Attorney, Agent, or Firm* — Holtz, Holtz, Goodman & Chick, PC (57) ABSTRACT

A holding member can be made to move up and down with long strokes by means of short vertical strokes so that the overall arrangement can be downsized and lightweight. Additionally, the holding member can be held to a constant attitude and the overall arrangement can be simplified to reduce the cost. A swing arm is adapted to be swung between the metal mold of a resin molding machine and the outside of the resin molding machine by means of a rotary shaft rotating in response to a vertical motion of an elevating body relative to a vertical frame and, at the same time, a fitting member is adapted to be driven to rotate in response to the swinging motion of the swing arm in order to control the attitude of a vertical arm so as to make its axial line aligned with the vertical direction.

8 Claims, 6 Drawing Sheets

APPARATUS FOR REMOVING RESIN MOLDED PRODUCT

BACKGROUND OF THE INVENTION

1. Field of the Invention

The present invention relates to an apparatus for removing resin molded product from a resin molding machine.

2. Related Art

There are known an apparatus for removing resin molded product including, for example, the one described in Patent Document 1 (JP 2003-300232A1), each including a main body frame fixed to the operation side or the anti-operation side of a fixed side platen in a resin molding machine and aligned with the central axial line of the resin molding machine so as to extend between the metal mold position and the injection unit side of the resin molding machine, a back and forth moving body supported by the main body frame so as to be movable relative to the main body frame in the direction of the central axial line, a transverse moving body supported by a transversal frame extending between the operation side or the anti-operation side and the metal mold position in the direction orthogonal relative to the central axial line of the back and forth moving body so as to be movable in that direction and a vertical unit for moving a holding member holding a resin molded product between the metal mold position and an upward position upwardly separated from the metal mold, the back and forth moving body, the transverse moving body and the vertical unit being driven to move the holding member in a three-dimensional direction and take out the resin molded product.

Safety doors that can be freely opened and closed are provided respectively at the operation side and at the anti-operation side of the metal mold site so as to entirely cover the metal mold site for the sake of safety of molding operation of the resin molding machine described in above cited Patent Document 1. Therefore, the vertical unit itself is required to use a large member that operates with long strokes in order to move the holding member for long vertical strokes in view of the necessity of reliably getting over the safety doors when taking out the resin molded product from the resin molding machine by means of the resin molded product take-out machine described in Patent Document 1. Then, as a result, the resin molded product take-out machine itself has large dimensions to give rise to a problem of high installation cost.

Additionally, when taking out a large resin molded product, the resin molding machine itself that is employed to produce such a large product is mostly large and hence a large space may be available around the machine. However, when taking out a small resin molded product, the resin molding machine itself that is employed to produce such a small product is mostly small and a large number of resin molding machines may have to be arranged in a given space for molding operations in view of achieving a high productivity. Then, it is normally difficult to secure a large space among the resin molding machines.

There are also known an apparatus for removing resin molded product for small resin molded products including, for example, the one described in Patent Document 2 (JP2003-245927), each including a main body frame fixed to the operation side or the anti-operation side of a fixed side platen in a resin molding machine and aligned with the central axial line of the resin molding machine so as to extend in the direction of the central axial line of the resin molding machine, a slider supported by the main body frame so as to be movable in the direction of the central axial line, an electric motor rigidly secured by the slider and having an axial line extending in the direction of the central axial line, a pivot arm having a base end section rigidly secured to the rotating shaft of electric motor and a front end section to which a vertical unit is fitted and a holding member arranged at the front, end section of the vertical unit to hold a resin molded product.

The apparatus for removing resin molded product described in the above-cited Patent Document 2 is so designed that the vertical unit is vertically activated in response to a turning motion of the pivot arm so as to make the holding section safely get over the tie bar and the safety doors of the resin molding machine.

However, a known apparatus for removing resin molded product having the above-described configuration is required to control the turning motion of the vertical unit in response to a turning motion of the pivot arm in view of the necessity of constantly holding the vertical unit to a vertically standing state. Then, a mechanism for making the turning motion of the vertical unit interlock with the turning motion of the pivot arm is required. This entails a problem of making the overall arrangement complex and costly.

Additionally, the front end section of the pivot arm inevitably becomes heavy. Then, it is necessary to use an electric motor that rotates at high speed with a high torque in order to turn such a pivot arm at high speed with a high responsiveness. Then, again, there arises a problem of making the overall arrangement complex and costly.

Therefore, one of the problems that the present invention is to dissolve is that the overall arrangement becomes large and heavy due to the use of a large vertical unit that operates with long vertical strokes when the holding member is made to operate with long vertical strokes in order to avoid interferences with the resin molding machine. Another one of the problems to be dissolved by the present invention is that an attitude control member needs to be installed for the holding member in order to control the attitude of the holding member relative to the pivot arm and make the holding member show a stable attitude when the pivot arm is driven to pivot.

SUMMARY OF THE INVENTION

According to the present invention, the above problems are dissolved by providing an apparatus for removing resin molded product including: a main body frame rigidly secured to the top surface of a fixed platen of a resin molding machine; an elevating body supported by a vertical frame arranged on the main body frame so as to be vertically movable relative to the vertical frame; a vertically moving member for vertically moving the elevating body; a swing arm rigidly secured to a rotary shaft pivotally supported by the elevating body so as to be capable of rotating; a swing member adapted to rotate the rotary shaft and swing the swing arm in response to a vertical motion of the elevating body; a fitting member pivotally supported at the front end section of the swing arm so as to be capable of rotating; an attitude control member for rotating the fitting member in response to a rotary motion of the rotary shaft; and a holding member to be fitted to the lower end of a vertical arm fitted to the fitting member with its axial line aligned with the vertical direction; the swing arm being adapted to be swung between the metal mold of the resin molding machine and the outside of the resin molding machine by means of the rotary shaft rotating in response to a vertical motion of the elevating body relative to the vertical frame, the fitting member being adapted to be driven to rotate in response to the swinging motion of the swing arm in order to control the attitude of the vertical arm so as to make its axial line aligned with the vertical direction.

Thus, according to the present invention, a holding member can be made to move up and down with long strokes by means of short vertical strokes so that the overall arrangement can be downsized and lightweight. Additionally, the holding member can be held to a constant attitude and the overall arrangement can be simplified to reduce the cost.

DETAILED DESCRIPTION OF THE INVENTION

In the best mode of carrying out the present invention, the swing arm is adapted to be swung between the metal mold of the resin molding machine and the outside of the resin molding machine by means of the rotary shaft rotating in response to a vertical motion of the elevating body relative to the vertical frame and, at the same time, the fitting member is adapted to be driven to rotate in response to the swinging motion of the swing arm in order to control the attitude of the vertical arm so as to make its axial line aligned with the vertical direction.

Embodiment

Now, an embodiment of the present invention will be described below by referring to the accompanying drawings.

Figure 1:
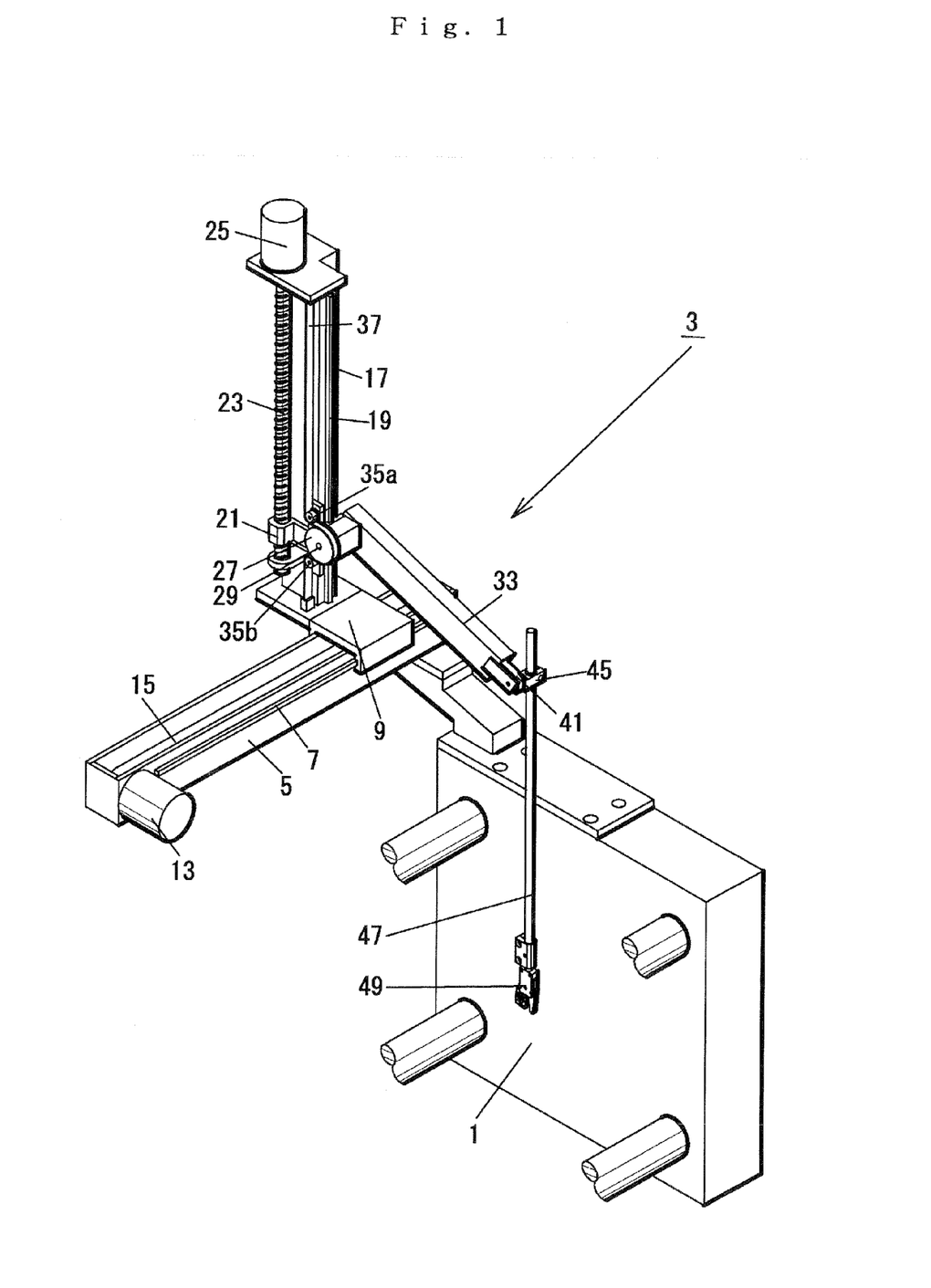
FIG. 1 is a schematic general perspective view of an apparatus for removing resin molded product according to an embodiment of the present invention.
Figure 2:
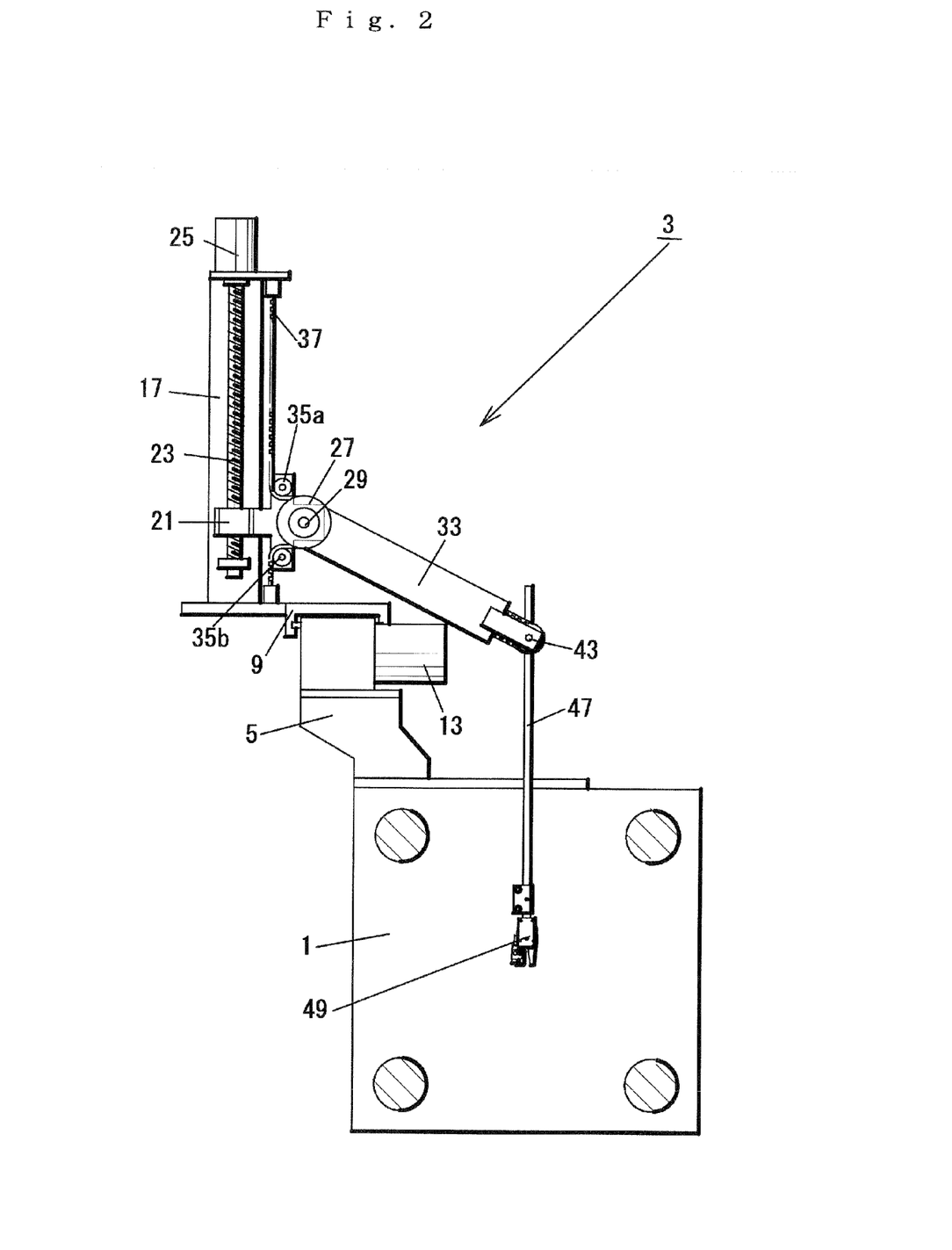
FIG. 2 is a schematic front view of the apparatus for removing resin molded product of the present embodiment.
Figure 3:
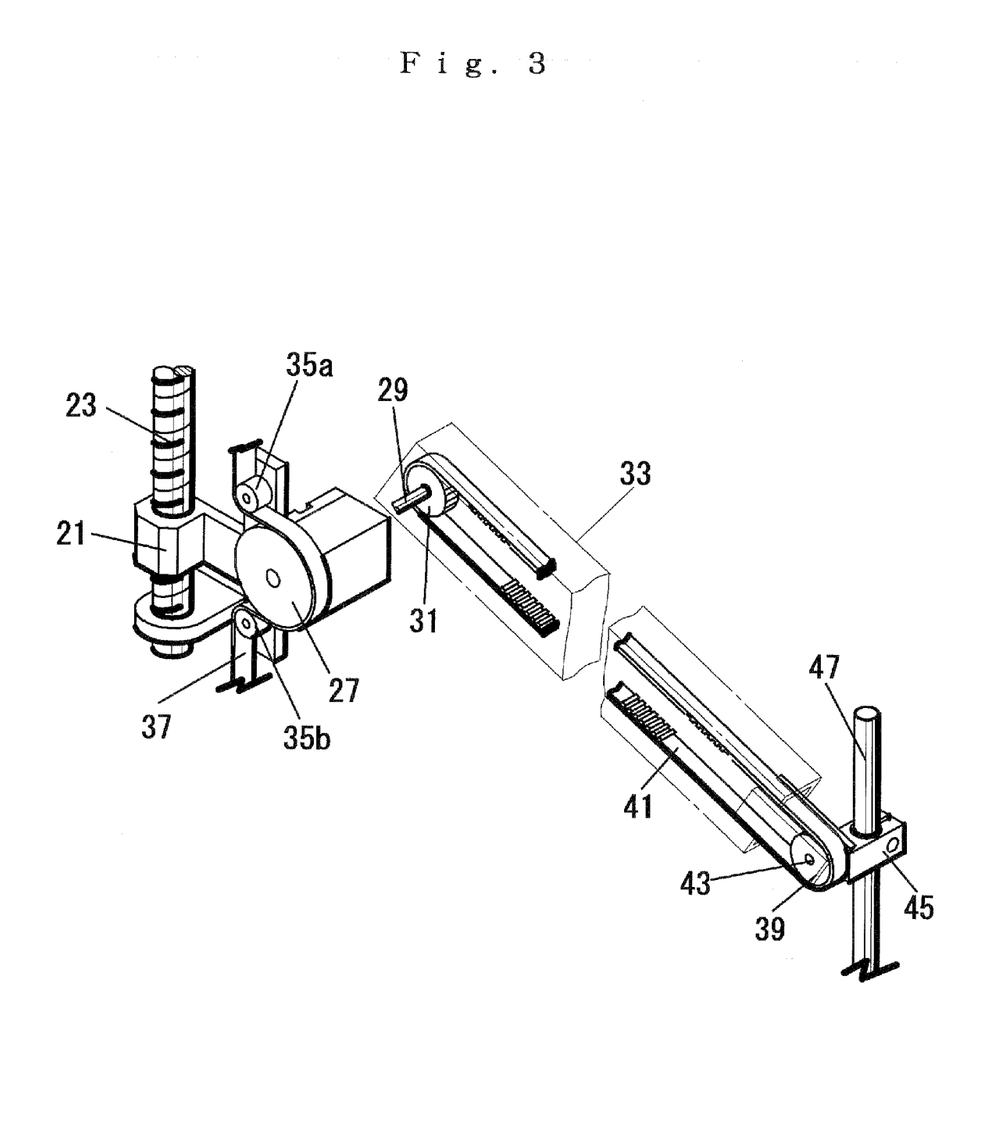
FIG. 3 is an exploded schematic view of the swing arm fitting state of the apparatus for removing resin molded product.

Referring firstly to FIGS. 1 through 3, an apparatus for removing resin molded product 3 according to the present invention is rigidly secured to the top surface of a fixed platen 1 of a resin molding machine at the operation side or at the anti-operation side thereof. The main body frame 5 of the apparatus for removing resin molded product 3 has such a length in the front-back direction that agrees with the central axial line of the resin molding machine that it extends between the opened one of the metal molds (not shown) and the fixed platen 1.

A rail 7 extending in the above-described front-back direction is rigidly secured to the main body frame 5. A movable body 9 is supported by the rail 7 so as to be movable in the front-back direction. Rotary bodies (not shown) that are typically toothed pulleys and constitute part of a moving member are pivotally supported at respective end sections of the main body frame 5 so as to be capable of rotating. One of the rotary bodies is linked to an electric motor 13 that is typically a numerically controllable servomotor and also constitutes part of the moving member. A toothed belt 15 that also constitutes part of the moving member is wound around the rotary bodies and the movable body 9 is rigidly fitted to a part of the toothed belt 15 so that the movable body 9 is driven to reciprocate in the front-back direction as the electric motor 13 is driven to operate.

The moving member of the movable body 9 may be a reciprocating mechanism whose axial line is aligned with the longitudinal direction of the main body frame 5 and which has a feed screw that is linked at an end section thereof to the electric motor and held in engagement with a nut section of the movable body 9.

A base end section of vertical frame 17 that extends in the vertical direction is rigidly secured to the movable body 9, while rail 19 that also extends in the vertical direction is rigidly secured to the vertical frame 17. An elevating body 21 is supported by the rail 19 so as to be capable of moving vertically. Vertical feed screw 23 that has a vertical axial line and constitutes part of a vertically moving member is pivotally supported by the vertical frame 17 so as to be capable of rotating. Electric motor 25 that is rigidly secured to an upper section of the vertical frame 17 and may typically be a numerically controllable servomotor, which has an axial line extending in the vertical direction and constitutes part of the vertically moving member, is linked to an upper end section of the vertical feed screw 23.

The vertical feed screw 23 is held in engagement with a nut section (not shown) arranged on the elevating body 21 so that the elevating body 21 is driven to reciprocate in the vertical direction as the electric motor 25 is driven to operate. The mechanism that vertically drive the elevating body 21 may be a rack-pinion mechanism including a rack gear (not shown) that vertically extends and rigidly secured to the vertical frame 17 and a pinion gear (not shown) that is rigidly secured to the output shaft of the electric motor 25 and held in engagement with the rack gear.

A rotary body 27 that may typically be a toothed pulley and constitutes part of a swing member is pivotally supported by the elevating body 21 so as to be capable of rotating. A base end side rotary body 31 that may typically be a toothed pulley and constitutes part of an attitude control member and a base end section of swing arm 33 that extends in a direction orthogonal relative to the front-back direction and has a required length are rigidly secured to a rotary shaft 29 of the rotary body 27.

Deflecting rollers 35a, 35b are pivotally supported respectively at an upper part and a lower part of the elevating body 21 with the rotary body 27 interposed between them. At toothed belt 37 is held in engagement with the rotary body 27 in a tensioned state. The toothed belt 37 constitutes part of the swing member and its opposite end sections are respectively rigidly secured to an upper part and a lower part of the vertical frame 17 while it is deflected by the deflecting rollers 35a, 35b. The rotary body 27 can be driven to rotate forwardly and backwardly as the electric motor 25 is driven to by turn drive the elevating body 21 to move in vertical directions.

Front end side rotary body 39 that may typically be a toothed pulley having a diameter same as the base end side rotary body 31 and constitutes part of the attitude control member is pivotally supported at an end section of the swing arm 33 so as to be capable of rotating. A toothed belt 41 that operates as attitude control travel member is wound around the base end side rotary body 31 and the front end side rotary body 39. The attitude control travel member may be a metal wire.

Fitting member 45 is rigidly secured to rotary shaft 43 of the front end side rotary body 39. A vertical arm 47 that extends in the vertical direction is rigidly fitted to the fitting member 45 but the position of the vertical arm 47 is adjustable. The vertical arm 47 is provided at a lower part thereof with a holding member 49 that is formed by an adsorption pad connected to a negative pressure source (not shown), an air cylinder connected to a compressed air source and so on. The holding member 49 holds product section or a runner section of resin molded product 51 when the resin molded product 51 that is molded by the resin molding machine is taken out to the outside of the resin molding machine.

Now, the operation of taking out a resin molded product of the apparatus for removing resin molded product 3 having the above-described configuration will be described below.

Figure 4:
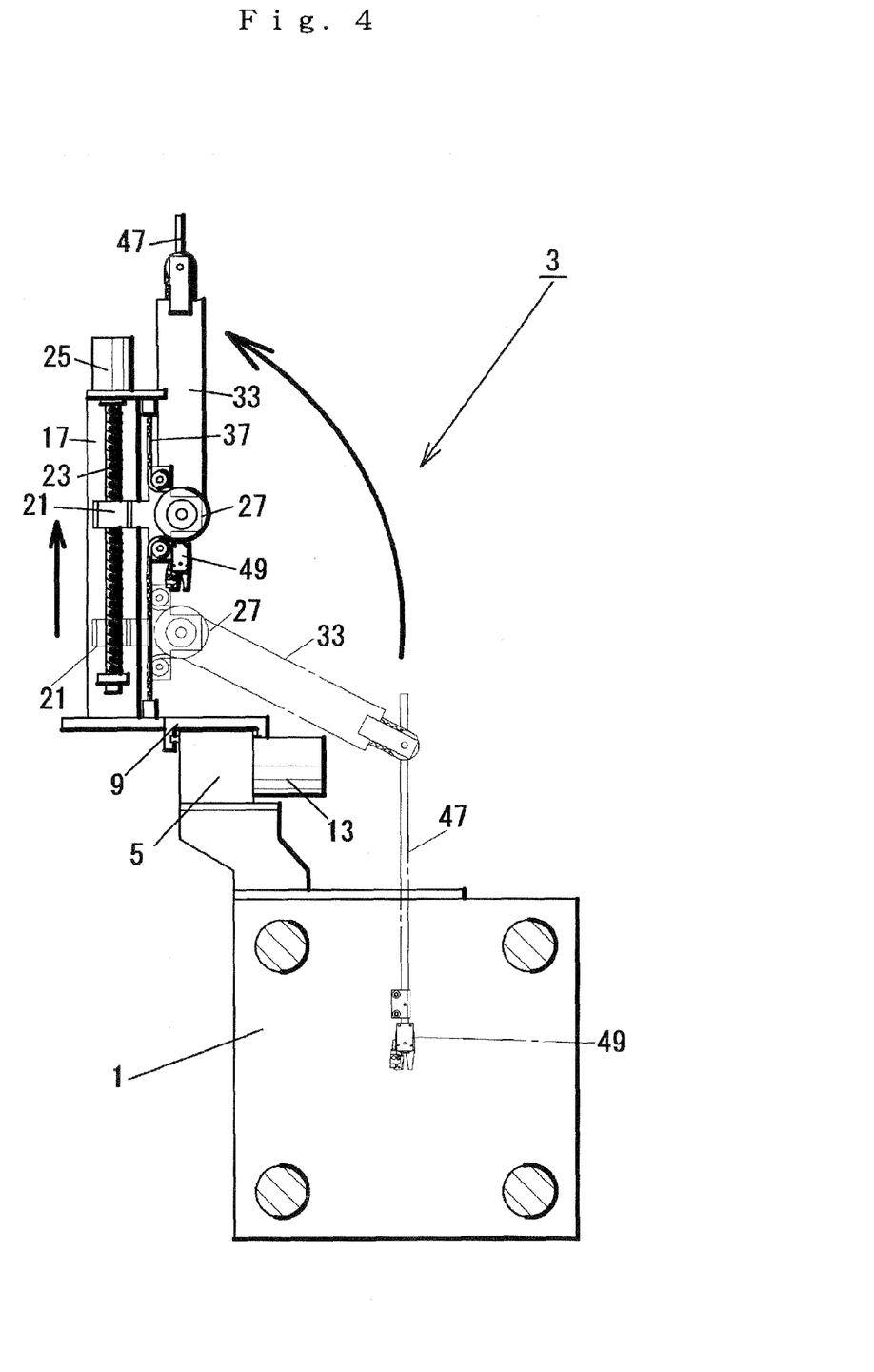
FIG. 4 is a schematic illustration of the holding member as moved to its upper limit position.

While the resin molding machine is operating to mold a resin molded product 51, the movable body 9 is moved to a longitudinally middle part of the main body frame 5 and held there on a standby state. At the same time, the elevating body 21 is moved to a middle part of the vertical feed screw 23 in the direction of its axial line and held there on a standby state. Meanwhile, the swing arm driven to turn upward around the rotary shaft 29 to take a substantially vertical state and the vertical arm 47 is also driven to turn around the rotary shaft 43 and take a vertical state. As a result, the holding member 49 for holding a resin molded product 51 is lifted upward so as to be able to get over the tie bar of the resin molding machine and the safety door closing a lateral surface of the metal mold. (See FIG. 4.)

As a mold-opening signal is input from the rosin molding machine in the above state, the electric motor 13 is driven to operate and so controlled as to move the movable body 9 toward the side of the movable metal mold of the resin molding machine. At the same time, the electric motor 25 is driven to operate and so controlled as to move the elevating body 21 downward and turn the swing arm 33 toward the side between the metal molds of the resin molding machine in order to bring the holding member 49 arranged at a lower part of the vertical arm 47 to position located close to the joining surface of the movable metal mold.

When the swing arm 33 is swung toward the side between the metal molds, the rotary shaft 43 of the front end side rotary body 39 is driven to rotate by driving the base end side rotary body 31 to rotate by means of the rotary body 27 that is driven to rotate as the elevating body 21 comes downward so as to drive the toothed belt 41 to travel in order to control the attitude of the vertical arm 47 and make it constantly directed to the vertical direction relative to the swinging swing arm 33. (See FIG. 2.)

As the resin molded product 51 is forced to project out from the inside of the movable metal mold by a projection mechanism (not shown) of the resin molding machine and held by the holding member 49 in the above-described state, the electric motor 13 is driven to rotate in the direction opposite to the above-described direction and move the movable body 9 to the side of the fixed platen 1. At the same time, the electric motor 25 is driven to rotate in the direction opposite to the above-described direction to move the elevating body 21 upward.

As the elevating body 21 moves upward and the rotary body 27 is turned in the sense as indicated by a solid arrow accordingly, the swing arm 33 is driven to turn in the sense as indicated by another solid arrow so as to become released from the metal molds. Then, the base end side rotary body 31 rotates integrally with the rotary body 27 that is turned as the elevating body 21 moves upward to drive the toothed belt 41 to travel in the sense as indicated by sill another solid arrow. As a result, the front end side rotary body 39 is driven to rotate. Consequently, the vertical arm 47 is attitude controlled and constantly held vertically relative to the swing arm 33 that is turned in the sense as indicated by a solid arrow.

when the electric motor 25 is driven to operate as described above to move the elevating body 21 to a middle part of the vertical feed screw 23 in the direction of its axial line, the swing arm 33 is turned upward to take a subsequently vertical position so that the holding member 49 that is holding a resin molded product 51 can get over the tie bar and the safety door. (See FIG. 4.)

As the movable body 9 is driven to move to the side of the fixed platen 1 and the elevating body 21 is driven to move further upward from the middle part of the vertical feed screw 23 in the direction of its axial line, the swing arm 33 is swung toward the outside of the fixed platen 1 of the resin molding machine to move the resin molded product 51 that is being held by the holding member 49 to the outside of the resin molding machine.

Then, as the elevating body 21 moves upward and the rotary body 27 is turned in the sense as indicated by a solid arrow accordingly in a manner as described above, the base end side rotary body 31 is forced to rotate by the rotary body 27 and drive the toothed belt 41 to travel. As a result, the front end side rotary body 39 is driven to rotate so that consequently the vertical arm 47 is attitude controlled and constantly held vertically relative to the swing arm 33 that is being swung.

Figure 5:
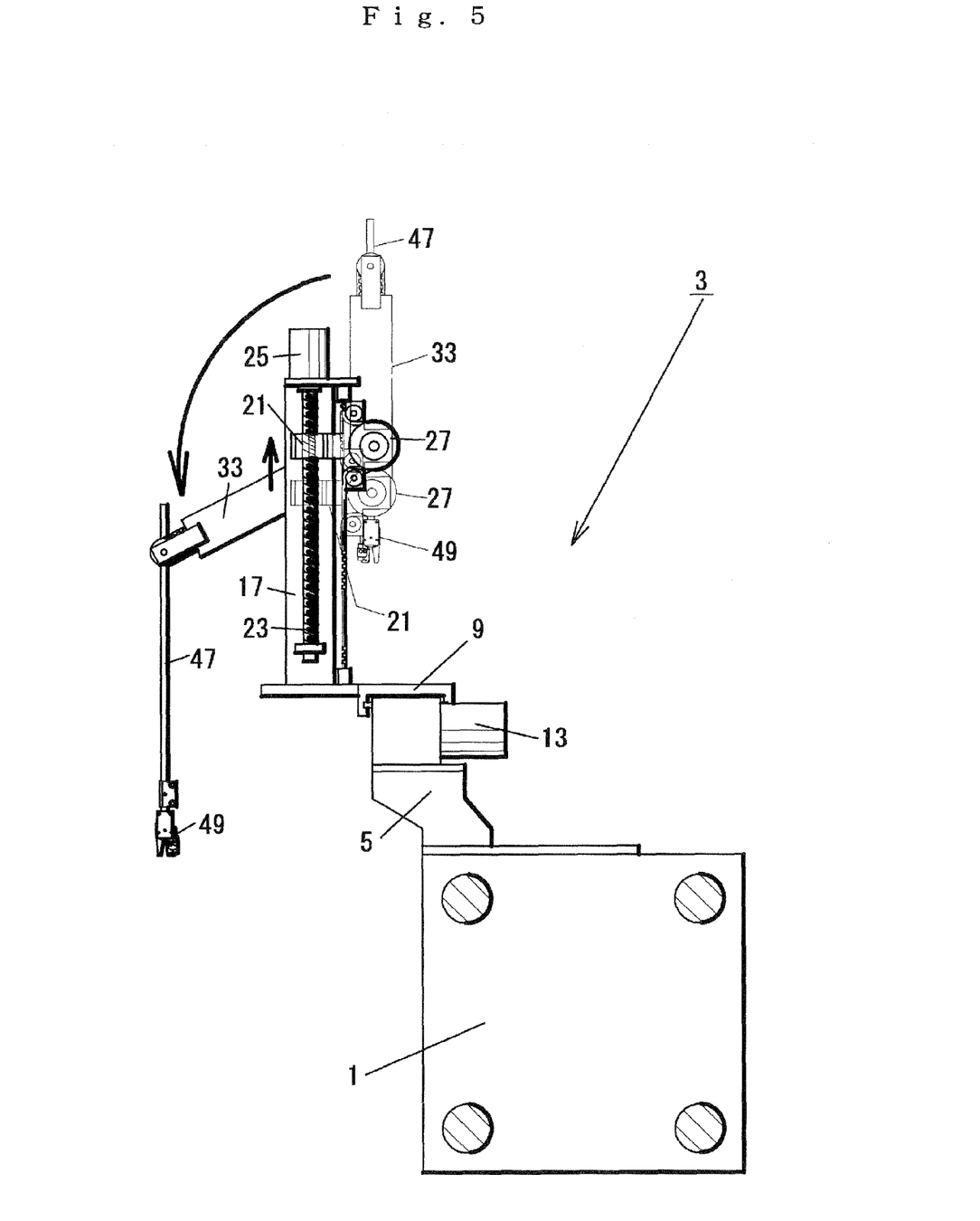
FIG. 5 is a schematic illustration of the holding member as moved to its molded product release position.

Then, as the movable body 9 is driven to move to a position close to the fixed platen 1 and the elevating body 21 is driven to move to an upper part of the vertical feed screw 23 in the direction of its axial line, the operation of driving the electric motor 13 is stopped to suspend the motion of the movable body 9 at a position close to the fixed platen 1 and also the operation of driving the electric motor 25 is stopped to suspend the swinging motion of the swing arm 33 at a position above the resin molded product releasing position outside the resin molding machine. (See FIG. 5.)

At this time, the base end side rotary body 31 rotates integrally with the rotary body 27 that is rotated as the elevating body 21 moves upward to drive the toothed belt 41 to travel in the sense indicated by sill another solid arrow in a manner as described above. Then, as a result, the front end side rotary body 39 is driven to rotate so that consequently the vertical arm 47 is attitude controlled and constantly held vertically relative to the swing arm 33. Under this condition, the holding member 49 is brought to the resin molded product releasing position, where the resin molded product 51 that has been held by the holding member 49 is released to complete the operation of taking out the resin molded product 51.

After the completion of the operation of taking out the resin molded product 51, the electric motor 13 is driven to rotate in the sense opposite to the above-described one to move the movable body 9, for example, to a middle part of the main body frame 5 in the longitudinal direction thereof and, at the same time, the electric motor 25 is also driven to rotate in the sense opposite to the above-described one to move the elevating body 21, for example, to a middle part of the vertical feed screw 23 in the direction of its axial line and swing the swing arm 33 to the side of the resin molding machine in order to hold it there on a standby state until the next resin molding operation is completed.

Figure 6:
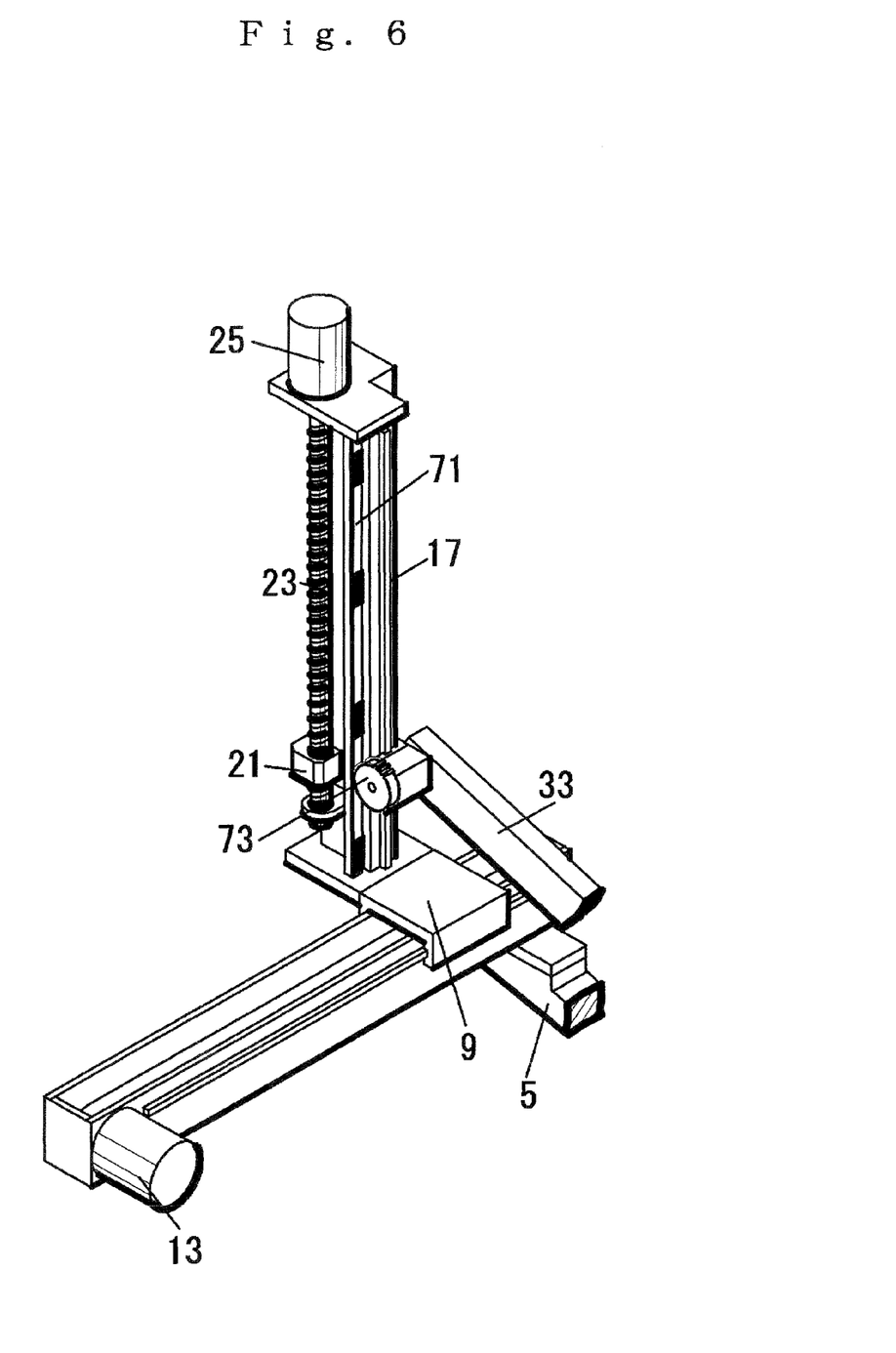
FIG. 6 is a schematic illustration of a modified swinging member.

The swing member is formed by the rotary body 27 that is pivotally supported by the elevating body 21 so as to be capable of rotating and the toothed belt 37 is wound around the outer peripheral surface of the rotary body 27 in a state where its opposite end sections are respectively rigidly secured to an upper part and a lower part of the vertical frame 17, while the rotary body 27 is driven to rotate forwardly and backwardly to swing the swing arm 33 forwardly and backwardly as the elevating body 21 moves up and down respectively in the above-described arrangement. However, alternatively, a rack gear 71 may be arranged so as to project vertically upwardly and downwardly relative to the vertical frame 17 and a toothed pulley 73 may be pivotally supported by the elevating body 21 so as to be capable of rotating and made to be held in engagement with the rack gear 71 as shown in FIG. 6 so that the swing arm 33 may be swung forwardly and backwardly by driving the elevating body 21 to move up and down, thereby rotating the toothed pulley 73 forwardly and backwardly respectively.

What is claimed is:

1. An apparatus for removing resin molded product comprising:
   a main body frame rigidly secured to the top surface of a fixed platen of a resin molding machine;
   an elevating body supported by a vertical frame arranged on the main body frame so as to be vertically movable relative to the vertical frame;
   a vertically moving member for vertically moving the elevating body;
   a swing arm rigidly secured to a rotary shaft pivotally supported at the front end section of the elevating body so as to be capable of rotating;
   a swing member adapted to rotate the rotary shaft and swing the swing arm in response to a vertical motion of the elevating body;
   a fitting member pivotally supported at the front end section of the swing arm so as to be capable of rotating;
   an attitude control member for rotating the fitting member in response to a rotary motion of the rotary shaft; and
   a holding member to be fitted to the lower end of a vertical arm fitted to the fitting member with its axial line aligned with the vertical direction;
   the swing arm being adapted to be swung between the metal mold of the resin molding machine and the outside of the resin molding machine by means of the rotary shaft rotating in response to a vertical motion of the elevating body relative to the vertical frame, the fitting member being adapted to be driven to rotate in response to the swinging motion of the swing arm in order to control the attitude of the vertical arm so as to make its axial line aligned with the vertical direction.

2. The apparatus for removing resin molded product machine according to claim 1, wherein the vertical frame extending in the direction of the central axial line of the resin molding machine is arranged on a movable body that is supported so as to be capable of moving in the direction of the its central axial line of the resin molding machine.

3. The apparatus for removing resin molded product according to claim 1, wherein the vertically moving member is to by a vertical feed screw having a vertical axial line and pivotally supported by the vertical frame so as to be capable of rotating and a numerically controllable electric motor for driving the vertical feed screw to rotate, the vertical feed screw being held in engagement with a nut arranged on the elevating body.

4. The apparatus for removing resin molded product according to claim 1, wherein the swing member is formed by a rotary body pivotally supported by the elevating body so as to be capable of rotating and a swing travel member wound around the peripheral surface of the rotary body in a state where its opposite end sections respectively rigidly secured to an upper part and a lower part of the vertical frame, the swing travel member wound around the outer peripheral surface of the elevating body driving the rotary body to rotate so as to turn the swing arm in response to a upward or downward motion of the elevating body.

5. The apparatus for removing resin molded product according to claim 4, wherein the rotary body is formed by a toothed pulley and the swing travel member is formed by a toothed belt held in engagement with the toothed pulley.

6. The apparatus for removing resin molded product according to claim 1, wherein the swing member is formed by a toothed pulley pivotally supported by the elevating body so as to be capable of rotating and a rack gear arranged to project upward and downward relative to the vertical frame and held in engagement with the toothed pulley.

7. The apparatus for removing resin molded product according to claim 1, wherein the attitude control member is formed by a base end side rotary body rigidly secured integrally with the rotary body at the base end side of the swing arm, a front end side rotary body rigidly secured integrally with the fitting member at the front end side of the swing arm and an attitude control travel member wound around the base end side and front end side rotary bodies.

8. The apparatus for removing resin molded product according to claim 7, wherein the base end side and front end side rotary bodies are formed by respective toothed pulleys and the attitude control travel member is formed by a toothed belt.

* * * * *